June 26, 1956
H. BACHL
2,751,748
THERMODYNAMIC PLURAL-SUBSTANCE PROCESSES AND PLANTS
FOR CONVERTING HEAT INTO MECHANICAL ENERGY
Filed Oct. 26, 1953
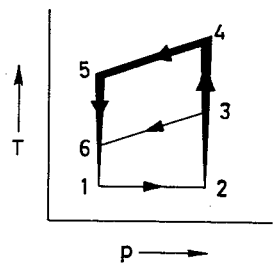
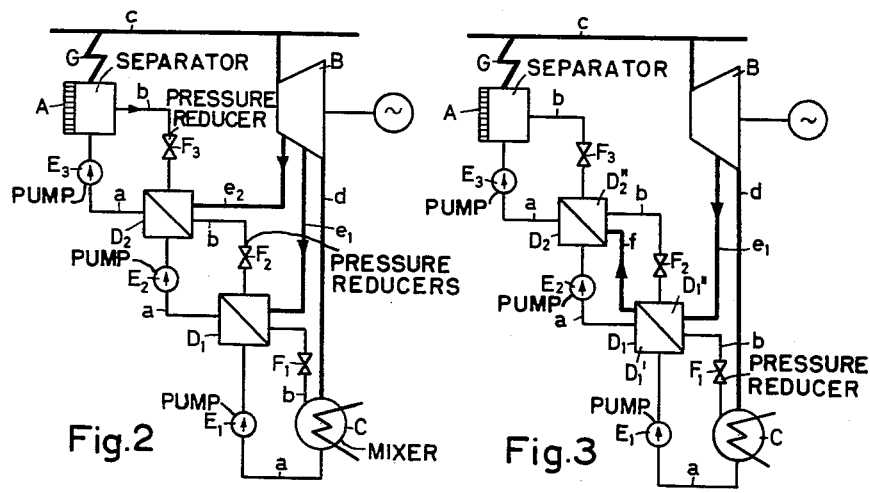
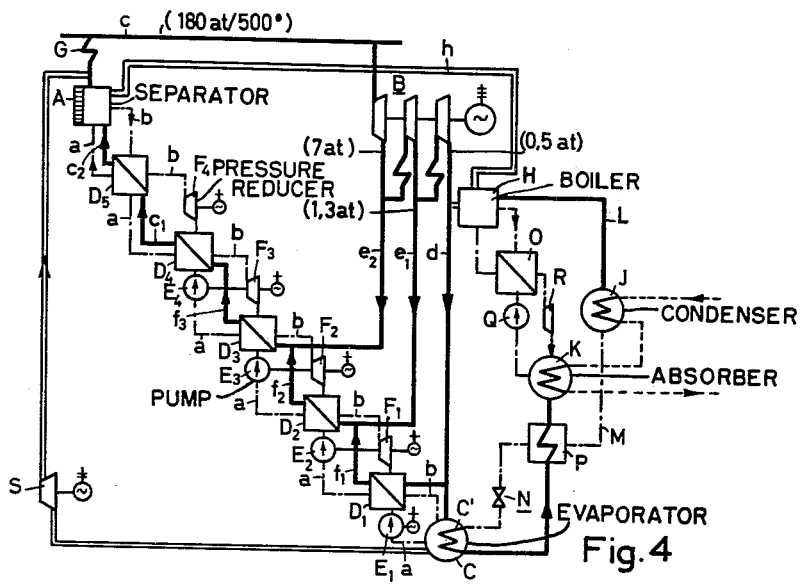
Inventor:
Herbert Bachl United States Patent Office 2,751,748
Patented June 26, 1956

2,751,748

THERMODYNAMIC PLURAL-SUBSTANCE PROCESSES AND PLANTS FOR CONVERTING HEAT INTO MECHANICAL ENERGY

Herbert Bachl, Erlangen, Germany

Application October 26, 1953, Serial No. 388,355

Claims priority, application Germany September 3, 1951

11 Claims. (Cl. 60—36)

My invention relates to thermodynamic-cycle processes and plants for the conversion of thermal energy into mechanical energy and is hereinafter described with reference to the drawings, in which—

Fig. 1 is explanatory and shows schematically a pressure-temperature diagram of a thermodynamic cycle typifying the principle of such processes;

Figs. 2 and 3 are schematic diagrams of two power plants according to the invention; and Fig. 4 is another, more complex embodiment of a plant according to the invention and shows the same reference characters as Figs. 2 and 3 for respectively similar elements.

Thermodynamic cycle processes for converting heat into mechanical energy, whereby the heat is supplied in a heat exchanging means in front of the engine generally comprise the sequential steps of increasing the pressure of a working medium in a low temperature stage, then heating it in the high pressure stage, then lowering its pressure in a heat engine, thereby converting part of its internal energy into useful external power, and recovering part of the residual heat by pre-heating the working medium, after increasing its pressure the remainder of the residual heat being dissipated as heat loss. The lowering of the pressure occurs in the gaseous phase of the working medium. The raising of the pressure is effected in the gaseous phase (for instance, in gas turbine cycles by the compressor) or in the liquid phase (for instance, in the steam cycle by the feed pump). It is further known in binary-fluid processes to transfer useful heat from a high-temperature cycle to a low-temperature cycle. The two cycles are interconnected either by interposing a heat exchanger between two separate cycle systems (for instance, in mercury-steam processes) or by directly superimposing a main cycle and an auxiliary cycle. In the latter case, the working medium of the auxiliary cycle in the liquid phase consists in a mixture of at least two components, for instance, of a solution of a gas in a liquid. The gaseous component of the same mixture serves as the working medium of the main cycle.

The operating principle of such a binary-fluid process is represented by the coordinate p–T diagram shown in Fig. 1. From point 1 to point 2, the pressure of the liquid mixture is raised by a pump. Thereafter, the liquid mixture is heated up to the temperature 3, and a component of it is expelled in the gaseous phase. The expelled gas is superheated from point 3 up to point 4 and is then expanded to a lower pressure in a power generating engine down to point 5 (main cycle). The expanded gas is then cooled from point 5 down to point 6. The liquid component of the mixture is likewise expanded from point 3 to point 6, for instance, by a fluid turbine (auxiliary cycle). From point 6 on, the gaseous component reenters into the liquid so that the working medium is again in the liquid phase of the mixture when reaching the initial point 1 of the cycle.

It is an object of my invention to devise, on the basis of the described binary principle, an economically applicable process of a high thermal efficiency.

To this end, and in accordance with my invention, I conduct the described auxiliary-cycle process in such a manner that the heating and raising the pressure of the liquid mixture, as well as the cooling, expanding and a change in concentration by reentry of gas, are carried out in a plurality of pressure stages within a number of serially connected heat exchangers. Simultaneously, a heat exchange takes place in each pressure stage between the working substance being heated and the working substance being cooled.

Before explaining this more in detail, it will be helpful to point out that the term "gas" and its derivations are here understood to refer to gas as well as vapor, and that the term "mixture" is here used to also include solutions of the substance components in each other. The expression "poor mixture" is used to denote a mixture in its liquid phase containing a relatively small quantity of the admixed or adsorbed gaseous component, while conversely the term "rich mixture" relates to a relatively large quantity of gaseous component.

The process according to the invention may be carried out by effecting the cooling of the poor mixture in different pressure stages and by bleeding from the heat engine respective amounts of gas and introducing them, for absorption, into the mixture in the respective pressure stages. This process is comparable to the regenerative steam-cycle process with the exception that the heat content of the extracted amounts of gas are not transferred to the liquid by condensation of the steam at a substantially constant temperature, but that the gas is first introduced (admixed) at sliding temperature into the poor mixture being cooled, and that a heat exchange takes place between the rich mixture and the poor mixture.

Fig. 2 shows the basic diagram of a power plant operating in accordance with the above-described process. The gaseous and the liquid components of the mixture are separated in a separator A (boiler). The gas leaving the separator A is heated by a heating surface G (superheater) from which it passes through the line $c$ to the power generating engine B in which the gas is expanded. The engine B is shown as a turbine driving an alternator. The expanded gas passes from engine B through the line $d$ into a mixer C (shown as a heat exchanger with cooling surface) which is supplied with liquid-poor mixture from separator A through a line $b$. The poor mixture and the gas combine in mixer C to again form the rich mixture which passes through the line $a$ back to the separator A.

Superimposed upon this simple and basic cycle are a number of partial processes. That is, not all of the gas is expanded in engine B down to the end pressure of the process (mixer C), but portions of the gas are bled off in one or several stages of the engine and are brought together with the poor mixture in respective intermediate mixers ahead of the mixer C. Consequently, the poor mixture leaving the separator A becomes enriched step by step by gas as it passes from separator A to the last mixer C.

The intermediate mixers are denoted by $D_1$ and $D_2$, while $e_1$ and $e_2$ denote the respective bleeder lines connecting the mixers with the heat engine B, the illustrated number of bleeder lines being chosen only as an example. Since the pressure of the intermediate stages decreases with decreasing values of the pressure of the respective bleeder lines, a pressure reducer $F_1$, $F_2$ and $F_3$ respectively is interposed between each two intermediate stages in the line $b$ that conducts the poor mixture. The pressure reducers $F_1$ to $F_3$ may operate as power generating engines (fluid turbines). In the direction toward the last mixer C, therefore, the pressure in the line $b$ decreases and so does the temperature, while seen from mixer C toward separator A, the temperature and the pressure in line $a$ increases. This affords the possibility, shown in Fig. 2, of simultaneously using the apparatus $D_1$ and $D_2$ as preheaters for the rich mixture passing from the last mixer C back to the separator A. For conveying the rich mixture through the line $a$ from mixer C to separator A, it is necessary to provide conveying or feed means such as pumps, as shown at $E_1$, $E_2$ and $E_3$ in Fig. 2.

It is also possible to bleed the gas for one or more of the intermediate pressure stages, not from the power engine but from a heat exchanger of a lower temperature range. Such a modification is illustrated in Fig. 3 wherein the same reference characters are used as in Fig. 2 for respectively similar elements.

In the plant according to Fig. 3, otherwise designed in accordance with Fig. 2, the rich mixture fed by pump $E_1$ is heated in portions $D'_1$ of heat exchanger $D_1$ by heat exchange with portion $D''_1$ so that part of the gaseous component is expelled from the mixture. This gas passes through a line $f$ into the heat exchanger $D_2$ where it is introduced in exchanger portion $D'_2$ into the poor mixture which is being cooled in the same pressure stage. Consequently, Fig. 3 differs from Fig. 2 essentially only in that the supply of steam from the engine B through the bleeder line $e_2$ in Fig. 2 is replaced in Fig. 3 by the supply of expelled gas through the line $f$.

The power plant according to Fig. 4 involves a combination of the above-mentioned two process possibilities. The plant of Fig. 4 is basically in accordance with Fig. 2 but is also equipped with additional gas supply lines $f_1$ to $f_3$ which lead to the heat exchangers $D_2$ to $D_4$ in the manner and for the purpose explained with reference to Fig. 3. The pressure reducers $F_1$ to $F_4$ for the liquid component on the cooled sides (line $b$) of the heat exchangers $D_1$ to $D_4$ in Fig. 4 consist of turbines which drive respective alternators. The pumps, $E_4$ to $E_2$ on the heated sides (line $a$) of heat exchangers $D_2$ to $D_4$ may be driven from the respective turbines $F_1$ to $F_3$ or the respective alternator voltages, while pump $E_1$ is shown driven by an alternating current motor. The pump $E_4$ increases the pressure to the highest pressure of the process. The expulsion of a part of the working gas which is led through the conduits $c_1$ and $c_2$ into the separator A is initiated in the heat exchangers $D_4$ and $D_5$. In this case the heating in the two heat exchangers is effected by the poor mixture which is cooled down in two pressure stages. Added to the plant according to Fig. 4 are two further auxiliary cycle processes described presently.

The heat supply to the process is effected by fuel burned in the separator A. For utilizing the lower temperature range of the fire gases, and according to another feature of my invention this heat of the fire gases is utilized in an absorption process for cooling purposes. The absorption process as such and the parts of the system associated therewith are known per se and form no part of the invention. The parts are denoted as follows: H is the separator, J is the condenser, K is the absorber, C is the evaporator, L is the conduit leading the expelled gas, M is the conduit provided for the liquid cooling means, O and P are heat exchangers, Q is a pump and R the means provided for the reduction of the pressure (throttle valve, turbine) of the poor liquid component. The separator H is heated by the exhaust gases of the separator A, indicated by the line $h$. The cooling effect of the absorption process is utilized in the heat exchanger C for transferring part of the heat not fully utilized in the main process at a higher temperature to the outside, for instance to cooling water, through the condenser J and the absorber K of the absorption cycle (second auxiliary process).

Suitable working gases for the main process are preferably organic substances that become partly dissociated and partly disintegrated at higher temperatures. As a working medium of the process the binary mixture water-monomethylamine, for example, may be employed. To prevent a progressing dissociation, it is preferable to subject the gaseous dissociation products remaining in the lowest temperature range, or also gases supplied from the outside, to compression by a compressor L which raises the pressure of the gaseous dissociation products up to the highest pressure stage and supplies them back to the gaseous component of the mixture immediately ahead of the superheater G (third auxiliary process), it being irrelevant whether or not a chemical change occurs in those gases prior to reentering into the main process.

It will be apparent from this disclosure to those skilled in the art, that my invention permits of various modifications and may be embodied in apparatus and plants other than those specifically illustrated and described, without departing from the essential features of my invention and within the scope of the claims annexed hereto.

I claim:

1. In a thermodynamic cycle process for converting heat into mechanical energy, comprising an auxiliary process with a working substance in the liquid phase composed of a mixture of at least two components, and a main process with a working substance consisting of a gaseous component of said mixture, in combination, the steps of effecting in the auxiliary process the heating of the mixture in a plurality of stages of sequentially higher pressures and higher temperatures, admixing in the stages of medium pressure and medium temperature an amount of expelled gas; expelling an essential amount of the gas in the highest pressure and temperature stages partly by recovered heat and partly by additionally supplied heat; thereafter superheating said amount of gas in the main process by supplying extraneous heat; expanding the superheated gas in an engine; and re-introducing the expanded gas, in the lowest pressure and temperature stage, into the liquid working substance of the auxiliary process.

2. In a thermodynamic cycle process for converting heat into mechanical energy, comprising an auxiliary process with a working substance in the liquid phase composed of a mixture of at least two components, and a main process with a working substance consisting of a gaseous component of said mixture, in combination, the steps of effecting in the auxiliary process the heating of the mixture in a plurality of stages of sequentially higher pressures and higher temperatures; withdrawing part of the gaseous working substance from the main process and admixing it to the liquid working substance in said stages of medium pressure and medium temperature; expelling an essential amount of the gas in the highest pressure and temperature stages partly by recovered heat and partly by additionally supplied heat; thereafter superheating said amount of gas in the main process by supplying extraneous heat; expanding the superheated gas in an engine; and re-introducing the remainder of the expanded gas, in the lowest pressure and temperature stage, into the liquid working substance of the auxiliary process.

3. In the process according to claim 2, the step of withdrawing said part of the gaseous working substance from said engine.

4. In a thermodynamic cycle process for converting thermal energy into mechanical energy, comprising an auxiliary process with a working substance in the liquid phase composed of a mixture of at least two components, and a main process with a working substance consisting of a gaseous component of said mixture, in combination, the steps of effecting in the auxiliary process the heating of the mixture in a plurality of stages of sequentially higher pressures and higher temperatures, expelling by heating an amount of gaseous component in a heat exchanger of one of said stages of lower pressure and admixing the expelled gas to the liquid in another one of said stages of a higher pressure.

5. In the process according to claim 2, the steps of withdrawing said part of the gaseous working medium from said engine, additionally expelling by heating an amount of gaseous component in a heat exchanger of one of said stages and admixing the expelled gas to the liquid in another one of said stages having a higher pressure on the heated side.

6. A thermodynamic plant for converting heat into mechanical energy, comprising a cyclical main system having a gaseous working substance, and a cyclical auxiliary system having a working substance in the liquid phase composed of a mixture of at least two components including said gaseous substance; said main system having a power engine and a mixer, said engine having an inlet for said gaseous substance and having an outlet, and conduit means connecting said outlet to said mixer; a gas-liquid separator and conduit means connecting said separator with said inlet to supply said gaseous substance to said engine; said auxiliary system having a plurality of series connected heat-exchanger stages connecting said separator with said mixer and containing said mixture of liquid and gaseous substances, said stages having respectively different pressures and temperatures increasing in the direction from said mixer to said separator whereby heat from the liquid substance being cooled and enriched with gaseous substance is transferred to the substance being heated; and gas-conduit means connecting one of said exchanger stages with a point of lower pressure of one of said two systems for admixing expelled gas to the mixture in said one exchanger stage.

7. A thermodynamic plant for converting heat into mechanical energy, comprising a cyclical main system having a gaseous working substance, and a cyclical auxiliary system having a working substance in the liquid phase composed of a mixture of at least two components including said gaseous substance; said main system having a heat engine and a mixer, said engine having an inlet for said gaseous substance and having an outlet and conduit means connecting said outlet to said mixer; a gas-liquid separator, and a conduit means connecting said separator with said inlet to supply said gaseous substance to said engine; said auxiliary system having a plurality of series connected heat-exchanger stages connecting said separator with said mixer and containing said mixture of liquid and gaseous substances, said stages having respectively different pressures and temperatures increasing in the direction from said mixer to said separator whereby heat from the liquid substance being cooled and enriched with gaseous substance in a lower-pressure stage is transferred to the substance being heated in a higher-pressure stage; said engine having a tap for withdrawing part of expanded gaseous substance from said main system; and gas conduit means connecting said tap with one of said heat exchanger stages for admixing said part of said gaseous substance to the liquid substance in said auxiliary system.

8. A thermodynamic plant for converting thermal energy into mechanical energy, comprising a cyclical main system having a gaseous working substance, and a cyclical auxiliary system having a working substance in the liquid phase composed of a mixture of at least two components including said gaseous substance; said main system having a power generating engine and a mixer, said engine having an inlet for said gaseous substance and having an outlet, and conduit means connecting said outlet to said mixer; a gas-liquid separator, and conduit means connecting said separator with said inlet to supply said gaseous substance to said engine; said auxiliary system having a plurality of series connected heat-exchanger stages connecting said separator with said mixer and containing said mixture of liquid and gaseous substances, said stages having respectively different pressures and temperatures increasing in the direction from said mixer to said separator whereby heat from the liquid substance being cooled and enriched with gaseous substance in a lower-pressure stage is transferred to the substance being heated in a higher-pressure stage; said engine having a plurality of taps for withdrawing respective amounts of gas of different pressures from said main system; and gas conduit means connecting said taps with said respective heat exchanger stages for admixing said amounts of gas to the liquid in said heat exchanger stages.

9. A plant according to claim 6, comprising pressure-increasing power-consuming machines connected between the respective heat exchanger stages of said auxiliary system on the heated side of said stages, and pressure-reducing power-generating engines connected between the respective heat exchanger stages on the cooled side thereof.

10. The process according to claim 2, comprising the steps of expelling and superheating the gaseous working substance in the highest pressure stage by applying a heating medium, utilizing the lower temperature range of said heating medium in an absorption refrigerating process, and using the cold thus produced for transforming part of the waste heat, evolving a low temperature from the main process, to normal cooling-water temperature.

11. In a process according to claim 2 wherein said gaseous working substance of the main process consists of an organic substance, the steps of withdrawing residual gaseous dissociation products remaining in the lowest temperature stage after liquefaction of the gaseous working medium, compressing the withdrawn residual products to the pressure of the highest pressure stage, and re-introducing the compressed products into said gaseous substance prior to superheating said gaseous substance.

References Cited in the file of this patent
UNITED STATES PATENTS
427,399 Campbell _____ May 6, 1890